United States Patent Office 3,769,388
Patented Oct. 30, 1973

3,769,388
OXIDATION OF HYDROGEN CYANIDE TO CYANOGEN IN A LIQUID MEDIUM CONTAINING A SOLUBLE NITRATE SALT OR NITRIC ACID
Kenneth L. Olivier, Placentia, and Michael J. Block, Montebello, Calif., assignors to Union Oil Company of California, Los Angeles, Calif.
No Drawing. Continuation-in-part of abandoned application Ser. No. 846,955, Aug. 1, 1969. This application July 28, 1971, Ser. No. 167,034
Int. Cl. C01c 3/00
U.S. Cl. 423—384     13 Claims

ABSTRACT OF THE DISCLOSURE

Hydrogen cyanide is oxidized to cyanogen by contacting hydrogen cyanide and oxygen with a substantially anhydrous liquid medium containing a minor, catalytic amount of silver, ruthenium or mercury and a nitrate at a temperature between 0° C. and about 150° C. and at a pressure sufficient to maintain liquid phase conditions. A preferred embodiment is conducting the reaction in the presence of nitrate of one of the aforementioned metals and an alkali metal nitrate.

DESCRIPTION OF THE INVENTION

This is a continuation-in-part of copending application, Ser. No. 846,955 filed Aug. 1, 1969, now abandoned. The invention relates to the oxidation of hydrogen cyanide to cyanogen in a liquid phase process conducted at low temperatures.

Various methods of producing cyanogen from hydrogen cyanide have been proposed. The vapor phase oxidation of hydrogen cyanide to cyanogen has been attempted with air over cobalt, palladium or platinum catalysts and with nitrogen dioxide over magnesium or calcium catalysts. These processes have achieved only low selectivities or have consumed stoichiometric quantities of nitrogen dioxide, an expensive oxidant. Attempts to provide simultaneous regeneration of the nitrogen dioxide in the vapor phase have been complicated by the necessity to remove water vapor from the gaseous products and reactants. Liquid phase oxidation with cupric oxide has involved complex process steps. Another attempt has combined a copper oxidant with nitrogen dioxide, again resulting in consumption of a stoichiometric quantity of nitrogen dioxide.

An object of the invention is to improve the production of cyanogen from hydrogen cyanide.

Another object of the invention is to provide an efficient and relatively uncomplicated process for the production of cyanogen from hydrogen cyanide in a liquid phase at low temperatures.

A still further object of the invention is to increase the selectivity, yields and conversion of hydrogen cyanide to cyanogen and to decrease the quantity of the inorganic nitrogen oxide required for converting hydrogen cyanide to cyanogen.

Other related objects will be apparent from the description of the invention to follow:

According to the invention, hydrogen cyanide is oxidized to cyanogen by contacting hydrogen cyanide and oxygen with a liquid medium containing a silver, ruthenium or mercury salt and a nitrate, at a temperature between 0° C. and about 150° C. preferably 0° to about 90° C. A preferred embodiment is contacting the reactants also in the presence of an alkali metal nitrate to maintain an optimum concentration of nitrate in the reaction mediums. The reaction proceeds according to the following equation:

$$2HCN + \tfrac{1}{2}O_2 \rightarrow (CN)_2 + H_2O$$

A part of the hydrogen cyanide is oxidized to carbon dioxide, however, as will be seen from the examples, the amount of carbon dioxide produced is minimal and the selectivity of cyanogen is high. Another important feature of the invention is that only catalytic amounts of the metal salt and the nitrate are required. The nitrate acts as a promoter or catalyst and is not a reactant as in prior art processes. Some of the nitrate is reduced and consumed in the process, however, the consumed quantity is minor and in all instances far less than the stoichiometric quantity necessary if the nitrogen oxide were the only oxidant. By-product water produced in the above reaction is advantageously removed and it is preferable that the reaction be conducted under substantially anhydrous conditions, e.g., less than 20 volume percent, preferably less than 10 volume percent water in the reaction medium.

The soluble salt of silver, ruthenium or mercury can be any inorganic compound that is soluble in the reaction medium and that does not have components which interfere with the reaction. The nitrate salts are, of course, preferred since the metal and nitrate catalyst requirements are both satisfied by these salts. Examples of such nitrates are argenous and argenic nitrate, mercurous and mercuric nitrate and ruthenium nitrate. Other salts of these metals that can be used are the halides, $C_1$ to $C_6$ carboxylates and sulfates, e.g., mercuric chloride, silver acetate, ruthenium bromide, silver sulfate, mercuric bromide, silver benzoate, etc.

The nitrate is, preferably an alkali metal nitrate such as lithium, sodium or potassium nitrate. Nitric acid can also be used. Because the salts and nitric acid are dissociated in solution, the contacting is effected in the presence of the nitrates of mercury, silver or ruthenium even when the latter metals are added as a nonnitrate salt since the nitrate anion is furnished by the nitrate salt or nitric acid.

The nitrates may be added to the medium or formed in situ by, for example, adding the metal or hydroxide thereof, e.g., metallic silver, mercury or ruthenium or sodium hydroxide, and adding nitric acid to or passing nitrogen dioxide into the reaction medium.

The catalytic metal nitrate salt should be present in the medium in catalytic quantities, e.g., 0.001–15, preferably 0.001–5 mole percent of the hydrogen cyanide introduced, or such that the amount of the catalytic metal nitrate salt is 0.001–15, preferably 0.001–5 weight percent of the reaction medium. When an alkali metal nitrate or nitric acid is also present as a promoter, it can be used at the same concentrations, i.e., from 0.001–15, preferably 0.001–5 mole percent of the reactant hydrogen cyanide or from 0.001–15, preferably from 0.001–5 weight percent of the reaction medium.

The source of oxygen necessary for the reaction may be air, pure oxygen, a mixture of nitrogen and oxygen or any other gas containing molecular oxygen with other components that are inert, i.e., non-reactive with the hydrogen cyanide, cyanogen or the reaction medium. It is preferred that an excess of oxygen be present, e.g., 2–100 times the stoichiometric amount required to oxidize hydrogen cyanide.

The reaction medium may be any organic liquid which is inert to the reactants, catalyst and oxidation products under the reaction conditions and one in which the metal catalyst and hydrogen cyanide are soluble. Oxygenated solvents such as carboxylic acids, alcohols and esters thereof are sufficiently polar to dissolve the nitrate salts and are also inert to the oxidation. A preferred medium is the carboxylic acids having 2 to about 12 carbons such as the aromatic carboxylic acids, e.g., benzoic, toluic, phthalic, naphthoic acids and the fatty acids, e.g., acetic, butyric, pivalic, caproic, caprylic, capric, lauric, and stearic acids. Acetic acid is the most preferred solvent. Anhydrides of these acids and their esters are also suitable, e.g., acetic anhydride, pivalic anhydride, ethyl acetate, ethyl formate, methyl acetate, furfuryl acetate, ethyl benzoate, methyl laurate, etc. Addition of anhydride is advantageous in that any by-product water is absorbed by the anhydride to maintain desirably anhydrous conditions.

Alcohols having from 2 to about 12 carbons can also be used such as the alkanols, e.g., methanol, ethanol, isopropanol, butanol, amyl alcohol, octanol, dodecanol, etc.; cycloalkanols, e.g., cyclobutanol, cyclohexanol, cyclooctanol, etc.; and mono-aromatic substituted alcohols such as benzyl alcohol, 2-phenylbutanol, tolylcarbinol, etc.

The reaction medium is preferably substantially anhydrous, i.e., contains less than about 20 and, most preferably less than 10 weight percent water. Anhydrous conditions may be maintained by addition of dehydrating agents such as the aforementioned acid anhydrides in amounts comprising 5 to 30, preferably 10 to 30, weight percent of the reaction medium. Substantially anhydrous conditions can also be maintained by vaporizing the water therefrom by, for example, withdrawing a portion of the liquid medium from the reaction zone, removing water therefrom and recycling the dehydrated medium to the reaction zone.

The reaction may be performed by relatively mild temperatures, e.g., 0°–150° C. preferably 0°–90° C. and most preferably 0°–50° C. At these low temperatures oxidation of hydrogen cyanide to by-product carbon dioxide is minimized and the selectivity of hydrogen cyanide to cyanogen is generally above about 95 percent. The lower temperatures also reduce the need for large amounts of heating and cooling facilities and pressures necessary to maintain liquid phase may be relatively low, e.g., 1 to 8, preferably 1 to 3 atmospheres absolute. Higher pressures, e.g., 1 to 20 atmospheres, however, may be used if desired.

The reaction can be performed batchwise or in a continuous fashion, however, a continuous process is preferred. A liquid phase comprising the reaction solvent, the metal nitrate catalyst and the alkali metal nitrate promotor, if the latter is used, can be introduced into a low-pressure reactor. Hydrogen cyanide (which may be added as a liquid or vapor), air and a minor amount of make-up nitrate, e.g., nitric acid, can be continuously passed into the reactor to contact the reaction medium and catalyst. The effluent gases are continuously taken overhead, transferred to a separator, cooled and water and other condensibles removed as bottoms and transferred to a distillation scheme to be discussed hereinafter. The uncondensibles containing chiefly nitrogen, oxygen, carbon dioxide, hydrogen cyanide, cyanogen and limited amounts of nitric oxide and dioxide are removed as a gaseous effluent and subjected to a washing operation to separate cyanogen and hydrogen cyanide. Any nitrogen oxide in the gaseous effluent from the washing operation may be separated from carbon dioxide and nitrogen and recycled to the reaction medium. In some processes, depending on the economics, the entire gas stream may be flared.

The aqueous mixture of hydrogen cyanide and cyanogen is taken from the bottom of the washing column and transferred to a distillation column where cyanogen and hydrogen cyanide are distilled overhead, transferred to another distillation column wherein cyanogen is taken overhead and sent to product storage. Hydrogen cyanide is recycled to the aforementioned reactor for further conversion to cyanogen. The condensibles from the separator just downstream of the reactor are transferred to a distillation column where nitrogen dioxide, cyanogen and hydrogen cyanide flow overhead, combine with the overhead stream from the aforementioned separator and are subjected to the above described operation. The bottoms comprising water and the reaction medium are transferred to a distillation column wherein water is flashed overhead and the reaction medium, which may contain entrained catalyst, is recycled to the reactor for further contact with hydrogen cyanide and oxygen.

As will be apparent from the examples, the process is not dependent on a stochiometric or even a substantial quantity of the metal or nitrate salts. Instead, the metal salts are present in amounts no greater than about 15 mole percent of the hydrogen cyanide reactant or, when both the metal catalyst and promotor nitrate are used, no greater than about 30 mole percent of the hydrogen cyanide reactant. The silver, mercury or ruthenium nitrate salts function catalytically while the alkali metal nitrate acts as a promoter. Some of the nitrates, however, are reduced to nitric oxide and can be removed with the effluent gases. It is desired that the consumption of the soluble nitrate be minimized for obvious economic reasons and therefore the ratio of the molar amount of cyanogen to the molar amount of nitric oxide in the effluent, which is an indication of the efficiency of the process, should be from 2 to about 30. This ratio is termed herein the "promoter efficiency ratio" and, in the case where copper is utilized, is generally above about 20.

The examples also demonstrate that in all cases the selectivity, i.e., the molar amount of hydrogen cyanide which is converted to cyanogen compared to the total hydrogen cyanide converted to all products, is relatively high in the process. The selectivity is determined by dividing twice the molar amount of cyanogen by twice the molar amount of cyanogen plus the molar amount of carbon dioxide in the effluent. The conversion of hydrogen cyanide to cyanogen and to by-products in the cases wherein a metal catalyst is utilized is relatively high indicating the favorable kinetic activity of the catalyst and promoter. The conversion is calculated by dividing twice the molar amount of cyanogen by twice the molar amount of cyanogen plus hydrogen cyanide in the effluent gas stream. The yield of cyanogen is defined as the molar amount of cyanogen produced per molar amount of hydrogen cyanide introduced into the reaction medium and is equivalent to conversion times selectivity.

EXAMPLE 1

The following example illustrates the invention and the results obtained thereby.

To a 500 milliliter 3-necked flask were added 250 milliliters acetic acid, 1 gram ruthenium trichloride trihydrate, and 1 gram lithium nitrate. Air at essentially ambient temperature and atmospheric pressure was continuously passed at a rate of 52.5 liters per hour through a hydrogen cyanide liquid reservoir maintained at 0° C. to saturate the air with hydrogen cyanide. The saturated air stream was continuously passed into the 500 milliliter flask containing the acetic acid solution of ruthenium and lithium nitrates. The temperature of the reaction medium was maintained at 9–10° C. throughout the run. A gaseous effluent was continuously removed from the flask and the effluent gas stream was periodically sampled and the samples were analyzed. The effluent gas stream was found to contain 16.7 mole percent hydrogen cyanide, 0.05 percent nitric oxide, 0 percent nitrogen dioxide, 0.07 percent carbon dioxide and 1.27 percent cyanogen with the balance comprising principally oxygen, nitrogen and water. After adjusting for the amount of carbon dioxide introduced in the feed air, the promoter efficiency ratio was calculated to be 25, selectivity 98 mole percent, conversion 13 percent and yield 12 percent.

When the experiment is repeated in the absence of the nitrate salts, essentially no oxidation to cyanogen occurs.

EXAMPLE 2

The experiment of Example 1 was repeated except that mercuric acetate was substituted for the ruthenium nitrate hydrate and the contacting was conducted at 11–14° C. The effluent gas contained 10.88 percent hydrogen cyanide, 0.05 percent nitric oxide, 0 percent nitrogen dioxide, 0.07 percent carbon dioxide and 1.23 percent cyanogen. The promoter efficiency ratio was calculated to be 25, selectivity 98.0 percent, conversion 19 percent and yield 18 percent.

EXAMPLE 3

The experiment of Example 2 was repeated except that silver nitrate and nitric acid were substituted for mercuric acetate and lithium nitrate and the reaction was conducted at 8-14° C. The effluent gas contained 8.46 percent hydrogen cyanide, 0.02 percent nitric oxide, 0 percent nitrogen dioxide, 0.07 percent carbon dioxide and 0.17 percent cyanogen. The promoter efficiency ratio was calculated to be 9, selectivity 89 percent, conversion 6 percent and yield 5.3 percent.

The preceding examples are intended solely to illustrate preferred modes of practice of the invention and to demonstrate results obtainable thereby. It is not intended that these examples be unduly limiting of the invention but, instead, it is intended that the invention be defined by the following claims.

We claim:

1. A method for the oxidation of hydrogen cyanide to cyanogen which comprises contacting hydrogen cyanide and oxygen with a substantially anhydrous reaction medium consisting of a carboxylic acid of 2 to 12 carbons, alkanol of 2 to 12 carbons or esters thereof and containing less than about 10 weight percent water and dissolved therein from 0.001 to 5 weight percent of a silver, mercury or ruthenium nitrate and from 0.001 to 5 weight percent of nitric acid or an alkali metal nitrate at a temperature between 0° and 90° C. and a pressure sufficient to maintain liquid phase conditions and withdrawing an effluent gas containing cyanogen and oxidation byproducts including nitric oxide with a molar ratio of cyanogen to nitric oxide from 2 to about 30.

2. The method of claim 1 wherein said temperature is from 0° to 50° C.

3. The method of claim 1 wherein said medium contains from 5 to 30 weight percent of the anhydride of said acid.

4. The method of claim 1 wherein said medium is acetic acid.

5. The method of claim 1 wherein said reaction medium contains silver nitrate and nitric acid.

6. The method of claim 1 wherein said reaction medium contains mercuric nitrate.

7. The method of claim 1 wherein said reaction medium contains ruthenium nitrate.

8. The method of claim 1 wherein said reaction medium contains an alkali metal nitrate.

9. The method of claim 1 wherein the amount of said silver, mercury or ruthenium nitrate is from 0.001 to 15 mol percent of the hydrogen cyanide introduced into contact with said reaction medium.

10. The method of claim 9 wherein said medium contains silver nitrate.

11. The method of claim 9 wherein said medium contains mercuric nitrate.

12. The method of claim 9 wherein said medium contains ruthenium nitrate.

13. The method of claim 8 wherein the amount of said alkali metal nitrate is from 0.001 to 15 mol percent of the hydrogen cyanide introduced into contact with said reaction medium.

References Cited

UNITED STATES PATENTS

| | | | |
|---|---|---|---|
| 3,065,057 | 11/1962 | Geerts et al. | 423—384 |
| 3,494,734 | 2/1970 | Nakamura | 23—151 |

FOREIGN PATENTS

| | | | |
|---|---|---|---|
| 1,163,302 | 2/1964 | Germany | 23—151 |
| 653,585 | 12/1962 | Canada | 23—151 |

EDWARD J. MEROS, Primary Examiner

H. S. MILLER, Assistant Examiner